(12) United States Patent
Hayama et al.

(10) Patent No.: US 10,641,179 B2
(45) Date of Patent: May 5, 2020

(54) SYSTEM AND METHOD FOR STARTING GAS TURBINE ENGINES

(71) Applicant: General Electric Company, Schenectady, NY (US)

(72) Inventors: Mauro Hayama, Mason, OH (US); Xin Zhao, West Chester, OH (US); Ming Tian, Mason, OH (US); Mikhel Hawkins, Cincinnati, OH (US); Koji Asari, Sharonville, OH (US); Thomas Charles Swager, Maineville, OH (US); Michael Allen Clawson, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 412 days.

(21) Appl. No.: 15/344,778

(22) Filed: Nov. 7, 2016

(65) Prior Publication Data
US 2018/0128182 A1    May 10, 2018

(51) Int. Cl.
*F02C 7/262*    (2006.01)

(52) U.S. Cl.
CPC .......... *F02C 7/262* (2013.01); *F05D 2220/32* (2013.01); *F05D 2220/323* (2013.01); *F05D 2260/85* (2013.01); *F05D 2270/092* (2013.01); *F05D 2270/304* (2013.01)

(58) Field of Classification Search
None
See application file for complete search history.

(56) References Cited

U.S. PATENT DOCUMENTS

| | | | | |
|---|---|---|---|---|
| 4,259,835 A | * | 4/1981 | Reed | F02C 9/28 60/39.281 |
| 4,274,255 A | * | 6/1981 | Pollak | F02C 7/26 60/790 |
| 4,350,008 A | * | 9/1982 | Zickwolf, Jr. | F02C 7/26 60/39.281 |
| 5,107,674 A | * | 4/1992 | Wibbelsman | F02C 7/26 60/778 |
| 5,303,541 A | | 4/1994 | Goff et al. | |
| 6,810,676 B2 | | 11/2004 | O'Connor | |
| 6,819,999 B2 | | 11/2004 | Hartzheim | |

(Continued)

OTHER PUBLICATIONS

International Search Report and Written Opinion issued in connection with corresponding PCT Application No. PCT/US17/056859 dated Jan. 22, 2018.

*Primary Examiner* — Steven M Sutherland
*Assistant Examiner* — Rodolphe Andre Chabreyrie
(74) *Attorney, Agent, or Firm* — Dority & Manning, P.A.

(57) ABSTRACT

A method of starting a gas turbine engine includes determining an abnormal shutdown condition during operation of the gas turbine engine and determining a first set of lightoff parameters for the gas turbine engine. The method also includes restarting the gas turbine engine using the first set of lightoff parameters. The method further includes iteratively determining subsequent first sets of lightoff parameters and restarting the gas turbine engine using a respective subsequent first set of the determined subsequent first sets of lightoff parameters until the gas turbine maintains a first set of operational parameters, where the first set of operational parameters is representative of a robust lightoff of the gas turbine engine.

17 Claims, 5 Drawing Sheets

(56) References Cited

U.S. PATENT DOCUMENTS

| | | | |
|---|---|---|---|
| 7,168,254 B2 | 1/2007 | Riley | |
| 7,216,489 B2 | 5/2007 | Uluyol et al. | |
| 7,331,169 B2 | 2/2008 | Riley | |
| 7,340,901 B2 | 3/2008 | Riley | |
| 7,506,517 B2 | 3/2009 | Uluyol et al. | |
| 7,878,004 B2 | 2/2011 | Davies et al. | |
| 8,321,120 B2 | 11/2012 | Riley | |
| 8,795,428 B1 * | 8/2014 | Hill | C04B 28/021 106/705 |
| 8,864,901 B2 * | 10/2014 | Lloyd | C04B 28/065 106/692 |
| 2006/0195248 A1 * | 8/2006 | Kim | F01D 21/14 701/100 |
| 2007/0051111 A1 * | 3/2007 | Uluyol | F02C 7/26 60/778 |
| 2015/0191250 A1 | 7/2015 | DeVita et al. | |
| 2016/0247074 A1 * | 8/2016 | Takeuchi | F01D 19/02 |

\* cited by examiner

FIG. 5

SYSTEM AND METHOD FOR STARTING GAS TURBINE ENGINES

BACKGROUND

The field of the invention relates generally to gas turbine engines, and more specifically, to a method and system for starting gas turbine engines.

At least some turbomachinery systems, including gas turbine engines, require special operational considerations for assisted start control under high altitude conditions. Some gas turbine aircraft engines, for example, operated at high altitudes utilize assisted start control schemes that do not adapt to widely varying operational and environmental conditions experienced at high altitudes. At least some systems and methods for starting gas turbine engines also do not take into account certain relevant operational parameters, and so take additional time to effect high altitude assisted starts given limited information available for use by the controller.

Further, at least some known systems and methods for starting gas turbine engines place restrictive limits upon air start envelopes, thereby limiting the ability of some aircraft engines to operate in high altitude airspace and at high elevation airports. Moreover, some known controllers for starting gas turbine engines are designed for specific engine configurations and operational conditions, and require redesign or reprogramming upon periodic engine upgrades including retrofit maintenance.

BRIEF DESCRIPTION

In one aspect, a method of starting a gas turbine engine is provided. The method includes determining an abnormal shutdown condition during operation of the gas turbine engine and determining a first set of lightoff parameters for the gas turbine engine. The method also includes restarting the gas turbine engine using the first set of lightoff parameters. The method further includes iteratively determining subsequent first sets of lightoff parameters and restarting the gas turbine engine using a respective subsequent first set of the determined subsequent first sets of lightoff parameters until the gas turbine maintains a first set of operational parameters, where the first set of operational parameters is representative of a robust lightoff of the gas turbine engine.

In another aspect, a system for starting a gas turbine engine is provided. The gas turbine engine includes a rotor and a combustor having an ignitor configured to ignite a fuel in the combustor. The system includes a starter in torque communication with the rotor, and a fuel flow valve in serial flow communication with the combustor and configured to inject the fuel into the combustor. The system also includes a plurality of sensors coupled to the gas turbine engine, and a controller communicatively coupled to the starter and communicatively coupled to the plurality of sensors. The controller includes a processor programmed to determine an abnormal shutdown condition during operation of the gas turbine engine and determine a first set of lightoff parameters for the gas turbine engine. The processor is also programmed to restart the gas turbine engine using the first set of lightoff parameters. The processor is further programmed to iteratively determine subsequent first sets of lightoff parameters and restart the gas turbine engine using a respective subsequent first set of the determined subsequent first sets of lightoff parameters until the gas turbine engine maintains a first set of operational parameters, where the first set of operational parameters are representative of a robust lightoff of the gas turbine engine.

In yet another aspect, a non-transitory computer-readable memory having computer-executable instructions embodied thereon is provided. When executed by a computing device, the computer-executable instructions cause the computing device to determine an abnormal shutdown condition during operation of a gas turbine engine and determine a first set of lightoff parameters for the gas turbine engine. When executed by a computing device, the computer-executable instructions also cause the computing device to restart the gas turbine engine using the first set of lightoff parameters. When executed by a computing device, the computer-executable instructions further cause the computing device to iteratively determine subsequent first sets of lightoff parameters and restart the gas turbine engine using a respective subsequent first set of the determined subsequent first sets of lightoff parameters until the gas turbine engine maintains a first set of operational parameters, the first set of operational parameters representative of a robust lightoff of the gas turbine engine.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the terms "non-transitory computer-readable media" and "non-transitory computer-readable memory" are intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and methods described herein provide for starting gas turbine engines including, without limitation, under high altitude operating conditions. The systems and methods described herein also facilitate adaptive assisted start control schemes to provide faster and more reliable gas turbine assistive starting relative to known systems and methods. The systems and methods described herein further facilitate fast and reliable assistive starting of gas turbine engines under widely varying operational and environment conditions such as high altitude airspace and at high elevation airports. Furthermore, the systems and methods described herein facilitate utilization of additional relevant parameters to provide assistive start controllers more information for use in improved control schemes relative to known systems. The systems and methods described herein also loosen operational restrictions with respect to air start envelopes for aircraft gas turbine engines. Moreover, the systems and methods described herein are implementable in a wide variety of gas turbine engines for aircraft and other turbomachinery systems, and are readily adaptable to retrofit and upgrade maintenance operations without requiring substantial redesign. The gas turbine engine starting systems and methods described herein are not limited to any single type of gas turbine engine or turbomachinery system, or operational or environment conditions thereof, but rather may be implemented with any system requiring a robust and adaptable assistive start control scheme to improve operational reliability, lessen the time required for assistive start under a wide variety of operational and environmental conditions, and increase the number of turbomachinery systems and gas turbine engines capable of benefiting therefrom.

Figure 1:
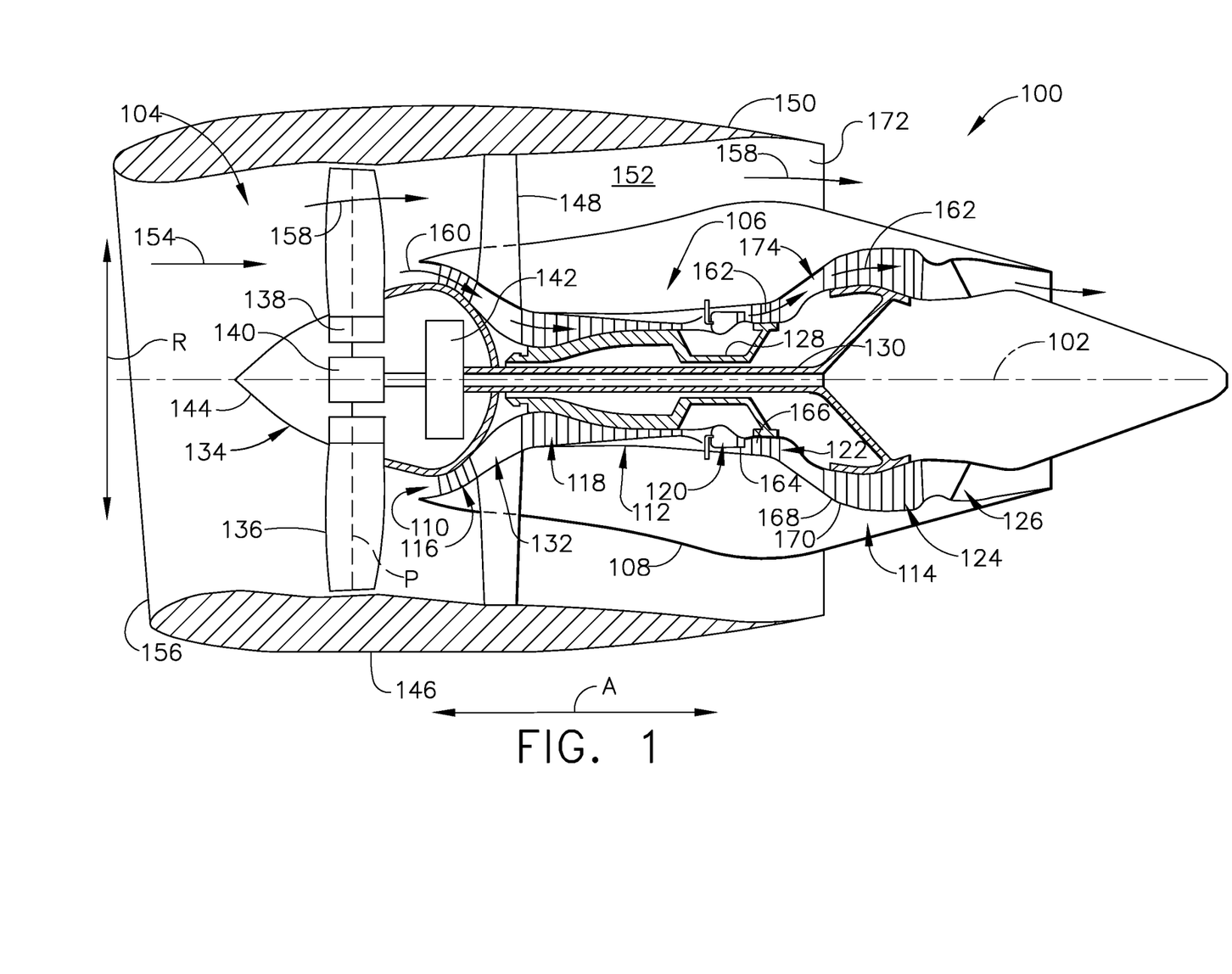
FIG. 1 is a schematic illustration of an exemplary gas turbine engine in accordance with an example embodiment of the present disclosure.

FIG. 1 is a schematic cross-sectional view of a gas turbine engine 100 in accordance with an exemplary embodiment of the present disclosure. In the exemplary embodiment, gas turbine engine 100 is embodied in a high-bypass turbofan jet engine. As shown in FIG. 1, gas turbine engine 100 defines an axial direction A (extending parallel to a longitudinal axis 102 provided for reference) and a radial direction R. In general, gas turbine engine 100 includes a fan section 104 and a core engine 106 disposed downstream from fan section 104.

In the exemplary embodiment, core engine 106 includes an approximately tubular outer casing 108 that defines an annular inlet 110. Outer casing 108 encases, in serial flow relationship, a compressor section 112 and a turbine section 114. Compressor section 112 includes, in serial flow relationship, a low pressure (LP) compressor, or booster, 116, a high pressure (HP) compressor 118, and a combustor 120. Turbine section 114 includes, in serial flow relationship, an HP turbine 122, an LP turbine 124, and an exhaust nozzle 126. Gas turbine engine 100 also includes at least one rotating member (e.g., a rotor) that rotates at a rotational velocity during operation of gas turbine engine 100. In the exemplary embodiment, rotor is embodied in an HP shaft, or spool, 128 that drivingly connects HP turbine 122 to HP compressor 118. Also, in the exemplary embodiment, an LP shaft, or spool, 130 drivingly connects LP turbine 124 to LP compressor 116. Compressor section 112, combustor 120, turbine section 114, and exhaust nozzle 126 together define a core air flowpath 132.

In the exemplary embodiment, fan section 104 includes a variable pitch fan 134 having a plurality of fan blades 136 coupled to a disk 138 in a spaced apart relationship. Fan blades 136 extend radially outwardly from disk 138. Each fan blade 136 is rotatable relative to disk 138 about a pitch axis P by virtue of fan blades 136 being operatively coupled to a suitable pitch change mechanism (PCM) 140 configured to vary the pitch of fan blades 136. In other embodiments, PCM 140 is configured to collectively vary the pitch of fan blades 136 in unison. Fan blades 136, disk 138, and PCM 140 are together rotatable about longitudinal axis 102 by LP shaft 130 across a power gear box 142. Power gear box 142 includes a plurality of gears (not shown) for adjusting the rotational speed of variable pitch fan 134 relative to LP shaft 130 to a more efficient rotational fan speed.

Disk 138 is covered by a rotatable front hub 144 that is aerodynamically contoured to promote airflow through fan blades 136. Additionally, fan section 104 includes an annular fan casing, or outer nacelle, 146 that circumferentially surrounds variable pitch fan 134 and/or at least a portion of core engine 106. In the exemplary embodiment, annular fan casing 146 is configured to be supported relative to core engine 106 by a plurality of circumferentially-spaced outlet guide vanes 148. Additionally, a downstream section 150 of annular fan casing 146 may extend over an outer portion of core engine 106 so as to define a bypass airflow passage 152 therebetween.

During operation of gas turbine engine 100, a volume of air 154 enters gas turbine engine 100 through an associated inlet 156 of annular fan casing 146 and/or fan section 104. As volume of air 154 passes across fan blades 136, a first portion 158 of volume of air 154 is directed or routed into bypass airflow passage 152 and a second portion 160 of volume of air 154 is directed or routed into core air flowpath 132, or more specifically into LP compressor 116. A ratio between first portion 158 and second portion 160 is commonly referred to as a bypass ratio. The pressure of second portion 160 is then increased as it is routed through HP compressor 118 and into combustor 120, where it is mixed with a fuel and burned to provide combustion gases 162.

Combustion gases 162 are routed through HP turbine 122 where a portion of thermal and/or kinetic energy from combustion gases 162 is extracted via sequential stages of HP turbine stator vanes 164 that are coupled to outer casing 108 and a plurality of HP turbine rotor blades 166 that are coupled to HP shaft 128, thus causing HP shaft 128 to rotate, which then drives a rotation of HP compressor 118. Combustion gases 162 are then routed through LP turbine 124 where a second portion of thermal and kinetic energy is extracted from combustion gases 162 via sequential stages of a plurality of LP turbine stator vanes 168 that are coupled to outer casing 108, and a plurality of LP turbine rotor blades 170 that are coupled to LP shaft 130 and which drive a rotation of LP shaft 130 and LP compressor 116 and/or rotation of variable pitch fan 134.

Combustion gases 162 are subsequently routed through exhaust nozzle 126 of core engine 106 to provide propulsive thrust. Simultaneously, the pressure of first portion 158 is substantially increased as first portion 158 is routed through bypass airflow passage 152 before it is exhausted from a fan nozzle exhaust section 172 of gas turbine engine 100, also providing propulsive thrust. HP turbine 122, LP turbine 124, and exhaust nozzle 126 at least partially define a hot gas path 174 for routing combustion gases 162 through core engine 106.

Gas turbine engine 100 is depicted in FIG. 1 by way of example only. In other exemplary embodiments, gas turbine engine 100 may have any other suitable configuration including for example, a turboprop engine.

Figure 2:
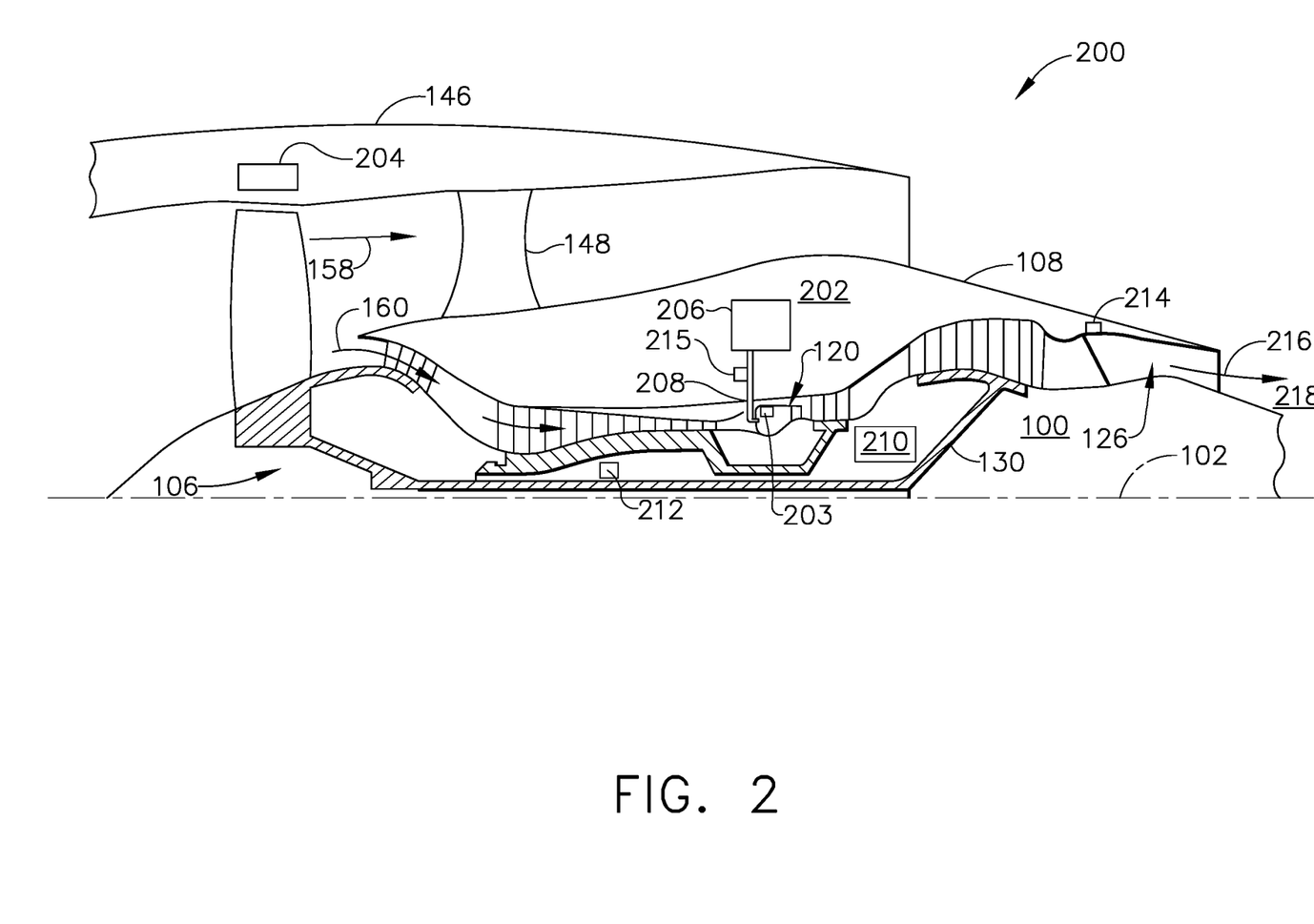
FIG. 2 is a schematic illustration of an exemplary system for starting a gas turbine engine that may be used with the gas turbine engine shown in FIG. 1.

FIG. 2 is a schematic illustration of an exemplary system 200 for starting a gas turbine engine that may be used with gas turbine engine 100 shown in FIG. 1, as well as other gas turbine engines and, more generally, rotatable machines including a rotating member. The use of the same reference symbols in different drawings indicates similar or identical exemplary elements for purposes of illustration. Referring to FIG. 2, core engine 106 includes a core compartment 202 between outer casing 108 and compressor 112 and turbine 114 sections. Core compartment 202 is also sometimes referred to as an equipment compartment. Core compartment 202 also includes an ignitor 203 coupled to at least a portion of an interior of combustor 120. System 200 includes a controller 204 embodied in an engine control unit (ECU) including, without limitation a full authority digital engine (or electronics) controller (FADEC), positioned, in the exemplary embodiment, in a protected location proximate fan casing 146. System 200 also includes a fuel flow valve 206 and a fuel line 208 in serial flow communication with combustor 120.

System 200 also includes at least one starter 210 coupled in torque communication with rotor (e.g., at least one of HP shaft 128 and LP shaft 130). In the exemplary embodiment, rotor is embodied in HP shaft 128, and starter 210 is coupled in torque communication with HP shaft 128 through, for example, a gear assembly (not shown). Also, in the exemplary embodiment, starter 210 is embodied in at least one of an electric motor and a compressed air motor, and includes at least one electrical switching device and at least one compressed air valve, respectively, to facilitate selectively applying an amount of torque to HP shaft 128 to facilitate increasing the rotational velocity thereof.

System 200 further includes a plurality of sensors including at least one speed sensor 212, at least one temperature sensor 214, and at least one fuel flow sensor 215. Plurality of sensors, fuel flow valve 206, starter 210, and ignitor 203 are communicatively coupled to controller 204, including through communication lines (not shown) passing through outlet guide vane 148 to core compartment 202. In an alternative embodiment, a wireless communication protocol is employed to accomplish data communication between controller 204 and at least one of fuel flow valve 206, starter 210, ignitor 203, and at least one sensor of plurality of sensors.

In operation, controller 204 receives a plurality of sensor signals from plurality of sensors. Speed sensor 212 measures a rotational velocity (e.g., revolutions per minute (rpm)) of HP shaft 128. Speed sensor 212 also transmits a speed sensor signal to controller 204 containing information representative of rotational velocity of HP shaft 128. Temperature sensor 214 measures a temperature of a flow of exhaust gas 216 vented from combustor 120 and diverted by exhaust nozzle 126 to an exterior 218 of gas turbine engine 100 axially aft from core compartment 202. Temperature sensor 214, including, without limitation, a thermocouple device, also transmits a temperature sensor signal to controller 204 containing information representative of temperature of exhaust gas 216. Fuel flow sensor 215 measures a flow rate of fuel from a fuel tank (not shown) through fuel flow valve 206 and into combustor 120. Fuel flow sensor 215 also transmits a flow sensor signal to controller 204 containing information representative of flow rate of fuel.

Controller 204 transmits a plurality of control signals to facilitate regulating the operation of ignitor 203, fuel flow valve 206, and starter 210. Controller 204 transmits a starter signal to starter 210 to facilitate selectively applying torque to HP shaft 128 to regulate rotational velocity thereof. Controller 204 also transmits an ignitor signal to ignitor 203 to facilitate alternately energizing and de-energizing ignitor 203. Controller 204 further transmits a valve signal to fuel flow valve 206 to facilitate regulating flow rate of fuel through fuel flow valve 206 into combustor 120.

Figure 3:
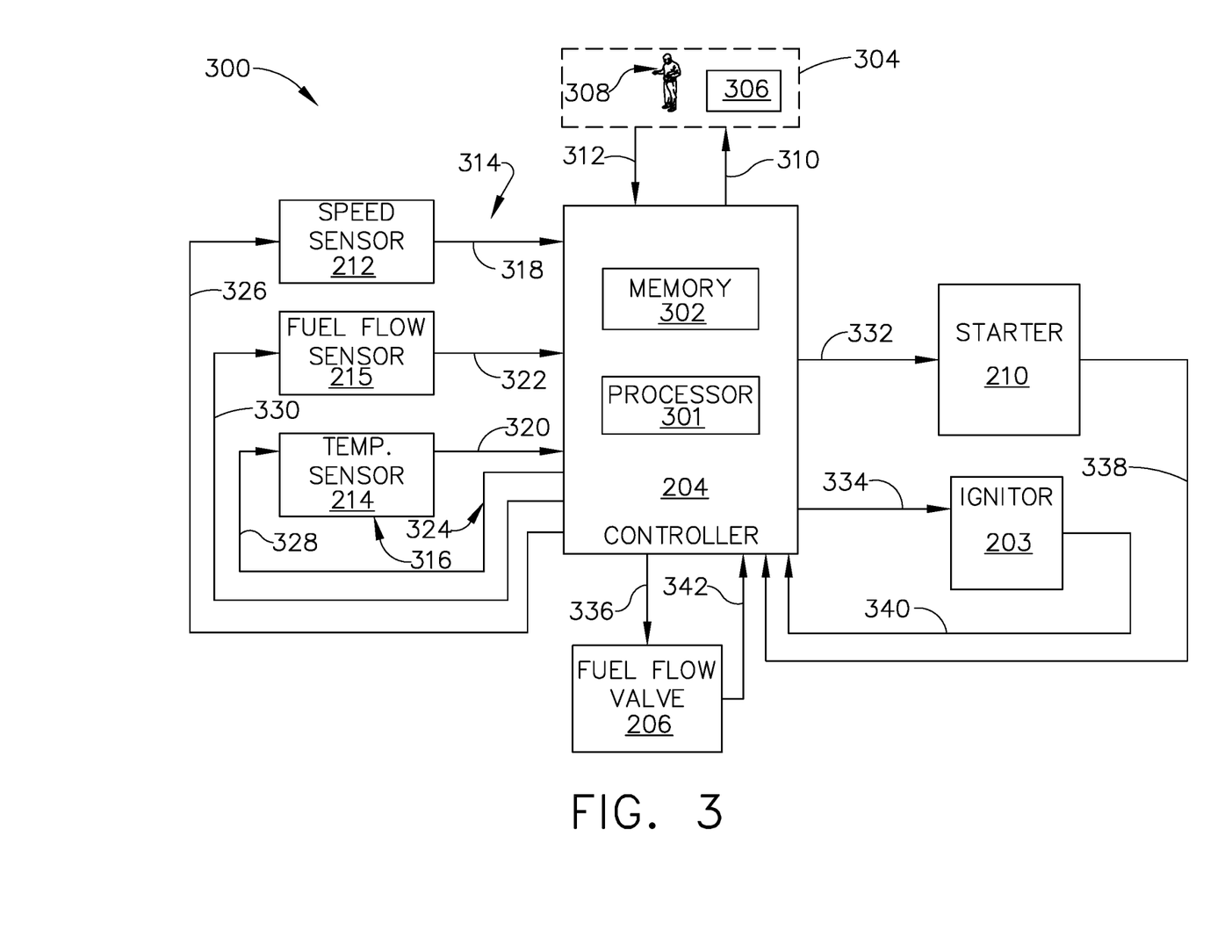
FIG. 3 is a block diagram illustrating a control system that may be used with the system for starting a gas turbine engine shown in FIG. 2.

FIG. 3 is a block diagram illustrating a control system 300 that may be used with system 200 shown in FIG. 2. In the exemplary embodiment, controller 204 includes a processor 301 communicatively coupled to a memory 302. Controller 204 is further communicatively coupled to a monitoring station 304. In the exemplary embodiment, where gas turbine engine 100 is embodied in an aircraft engine, monitoring station 304 includes an aircraft cockpit including a human machine interface (HMI) 306 including, without limitation, a display. Through monitoring station 304, a pilot 308 receives report signals 310 from controller 204 about operational characteristics of control system 300. Through monitoring station 304, pilot 308 also transmits command signals 312 to controller 204 to effect changes in operational characteristics of control system 300. In an alternative embodiment, not shown, monitoring station 304 is embodied in a remote command center including, without limitation, where gas turbine engine 100 is an unmanned aerial vehicle engine, and where report signals 310 and command signals 312 are received and transmitted, respectively, as wireless signals.

Also, in the exemplary embodiment, controller 204 is embodied in a computing device and memory 302 is embodied in a non-transitory memory 302 (e.g., one or more non-transitory computer-readable storage media) having computer-executable instructions embodied thereon. When executed by the computing device, the computer-executable instructions cause the computing device to facilitate starting gas turbine engine 100, as shown and described below with reference to FIGS. 4 and 5.

In operation, controller 204 receives a plurality of sensor signals 314 from plurality of sensors 316. Speed sensor 212 transmits a speed sensor signal 318 to controller 204 containing information representative of rotational velocity of HP shaft 128. Temperature sensor 214 transmits a temperature sensor signal 320 to controller 204 containing information representative of temperature of exhaust gas 216. Fuel flow sensor 215 transmits a flow sensor signal 322 to controller 204 containing information representative of flow rate of fuel.

Controller 204 also transmits a plurality of sensor control signals 324 to each sensor 316 of plurality of sensors 316. Controller 204 transmits a speed sensor control signal 326 to speed sensor 212, transmits a temperature sensor control signal 328 to temperature sensor 214, and transmits a fuel flow sensor control signal 330 to fuel flow sensor 215 to regulate an operation of a respective sensor 316 of plurality of sensors 316. For example, and without limitation, sensor control signals 324 facilitate regulating operation of plurality of sensors 316 including, without limitation, their powered on status, a timing of their measurements, and their measurement modes.

Controller 204 further transmits a plurality of control signals to facilitate regulating the operation of ignitor 203, fuel flow valve 206, and starter 210. Controller 204 transmits a starter signal 332 to starter 210 to facilitate selectively applying torque to HP shaft 128 to regulate rotational velocity thereof. Controller 204 transmits starter signal 332 having a first value to starter 210 to energize (e.g., turn on) starter 210 to facilitate applying torque to and increasing rotational velocity of HP shaft 128. Controller 204 transmits starter signal 332 having a second value different from first value to starter 210 to facilitate turning off starter 210 such that starter 210 no longer applies torque to HP shaft 128.

Controller 204 also transmits an ignitor signal 334 to ignitor 203 to facilitate alternately energizing and de-energizing ignitor 203. Controller 204 transmits ignitor signal 334 having a first value to ignitor 203 to energize ignitor 203 to facilitate combustion of fuel in combustor 120. Controller 204 transmits ignitor signal 334 having a second value different from first value to ignitor 203 when, for example, combustion of fuel in combustor 120 is capable of being maintained without energizing ignitor 203 during operation of gas turbine engine 100.

Controller 204 further transmits a valve signal 336 to facilitate opening fuel flow valve 206 to further facilitate regulating flow rate of fuel through fuel flow valve 206 into combustor 120. Controller 204 transmits valve signal 336 having a first value to fuel flow valve 206 to facilitate opening fuel flow valve 206 and injecting fuel at a predetermined flow rate into combustor 120. Also, in the exemplary embodiment, controller 204 transmits valve signal 336 having a range of values including, without limitation, first value corresponding to a first flow rate and a second value corresponding to a second flow rate that is at least one of different from and substantially equal to first fuel flow rate. Controller 204 transmitting a range of values of valve signal 336 thus facilitates a variable flow rate of fuel through fuel flow valve 206 into combustor 120 to further facilitate regulating rotational velocity of HP shaft 128. Controller 204 further transmits valve signal 336 having a shutdown value different from the first and second values to facilitate closing fuel flow valve 206 when, for example, gas turbine engine 100 is shutdown and injection of fuel into combustor 120 is no longer desired.

Controller 204 also receives a plurality of status signals 337 from ignitor 203, fuel flow valve 206, and starter 210. Starter 210 transmits a starter status signal 338 to controller 204 containing information representative of an operational status of starter 210 including, without limitation, a turned on status versus a turned off status of starter 210. Ignitor 203 transmits an ignitor status signal 340 to controller 204 containing information representative of an operational status of ignitor 203 including, without limitation, an energized status versus a de-energized status of ignitor 203. Fuel flow valve 206 transmits a valve status signal 342 to controller 204 containing information representative of an operational status of fuel flow valve 206 including, without limitation, an open status versus closed status of fuel flow valve 206, and an extent to which fuel flow valve 206 is open. In an alternative embodiment, fuel flow valve 206 includes fuel flow sensor 215, and valve status signal 342 includes information contained in flow sensor signal 322. Controller 204 uses plurality of status signals 337 to determine, for example and without limitation, operational statuses of ignitor 203, fuel flow valve 206, and starter 210, and whether one of more of ignitor 203, fuel flow valve 206, and starter 210 are available for use in control system 300 to carry out the methods described herein.

Processor 301 facilitates a timing of transmitting starter signal 332, ignitor signal 334, and valve signal 336, as well as the values thereof, based on receipt of information by processor 301 from plurality of sensors 316. As shown and described below with reference to FIGS. 4 and 5, processor 301 further facilitates implementation of control system 300 in system 200 to start gas turbine engine 100 in applications including, without limitation, aircraft engines, land and water vehicles, and non-vehicle turbomachinery applications.

Figure 4:
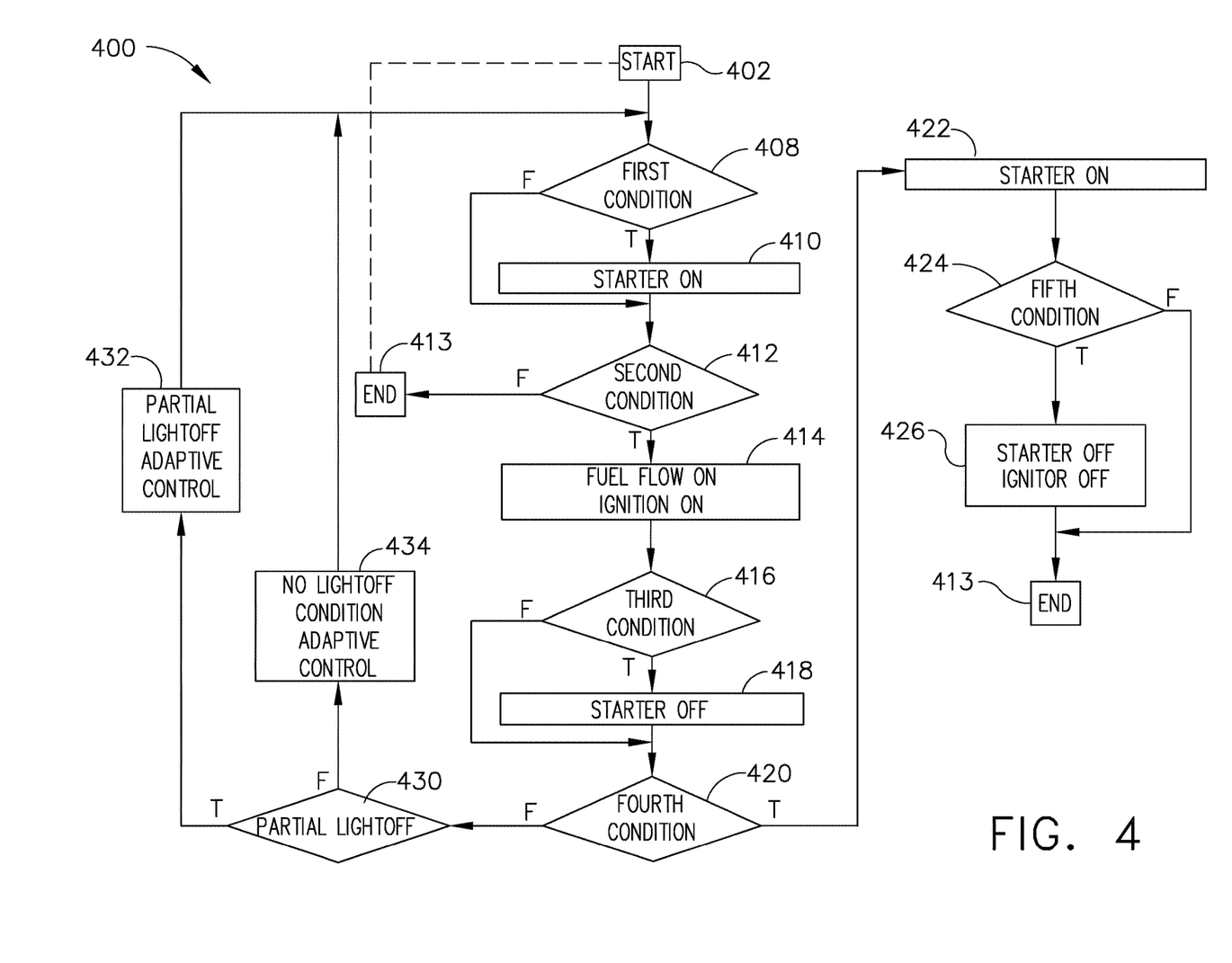
FIG. 4 is a state diagram of a control logic process for the control system shown in FIG. 3.

FIG. 4 is a state diagram of a control logic process 400 for control system 300 shown in FIG. 3. Process 400 includes a start state 402 including, without limitation, a present operating condition of gas turbine engine 100. In the exemplary embodiment, present operating condition includes a high-altitude operation of gas turbine engine 100, such as during a cruising altitude of an aircraft. Also, in the exemplary embodiment, start state 402 includes pilot commanded assisted start of gas turbine engine 100 in an aircraft following an abnormal shutdown condition of gas turbine engine 100. One having ordinary skill in the art will recognize and appreciate that the systems and methods described herein are applicable to gas turbine engines in a number of applications other than aircraft operating at high altitude, and where improved starting procedures as described herein are desirable. Also, in the exemplary embodiment, processor 301 performs steps of, and transitions between steps and states of process 400 in real-time.

Process 400 enters start state 402 upon processor 301 determining an abnormal shutdown condition during operation of the gas turbine engine 100 requiring restarting. In the exemplary embodiment, abnormal shutdown condition of gas turbine 100 occurs, for example, and without limitation, after a flame-out event of gas turbine engine 100 during high altitude cruising operation of an aircraft. Determining abnormal shutdown condition during operation of gas turbine engine 100 includes receiving inputs from plurality of sensors 316 by controller 204 and processor 301. For example, and without limitation, speed sensor signal 318 received by controller 204 and having a value less than a first predetermined rotational velocity value is determinative of abnormal shutdown condition of gas turbine engine 100. Similarly, temperature sensor signal 320 received by controller 204 and indicative of an exhaust gas 216 temperature value substantially equal to a temperature of exterior 218 of gas turbine engine 100 (e.g., an ambient temperature) is determinative of abnormal shutdown condition of gas turbine engine 100.

From start state 402, processor 301 is programmed to proceed to a step 408. During step 408, processor 301 is programmed to determine a first set of lightoff parameters for gas turbine engine 100. As used herein, the term "lightoff" refers to a requisite operational event for a successful starting of gas turbine engine 100. Lightoff is substantially the opposite of flame-out, and includes consistent combustion of fuel in combustor 120, including, without limitation, with assistance from ignitor 203. An extent of lightoff in gas turbine engine 100 varies over at least three lightoff categories. First, a robust lightoff is characterized by a full and sustained lightoff of gas turbine engine 100 that leads to successful starting thereof after increasing rotational velocity of rotor and de-energizing ignitor 203. Second, a partial lightoff is characterized by partial and intermittent combustion of fuel in combustor 120, and a diminished ability to successfully start gas turbine engine 100 after increasing rotational velocity of rotor and de-energizing ignitor 203. Finally, a no lightoff condition is characterized by lack of combustion of fuel in combustor 120, and thus a lack of ability to successfully start gas turbine engine 100 despite increasing rotational velocity of rotor using starter 210. In the exemplary embodiment, processor 301 determines category (e.g., extent) of lightoff of gas turbine engine 100 by using, for example, and without limitation, information received from plurality of sensors 316.

Lightoff parameters include at least one of predetermined values and predetermined ranges of values for fuel flow rate through fuel flow valve 206 into combustor 120. Lightoff parameters also include energized status versus de-energized status (e.g., an operational status versus a non-operational status) of ignitor 203. As processor 301 progresses through steps of process 400 as described herein, processor 301 uses information received through controller 204 from plurality of sensors 316 to determine an effect of varying lightoff parameters on gas turbine engine 100 operational parameters representative of extent of lightoff. In the exemplary embodiment, first set of lightoff parameters are stored in memory 302 and are predetermined based on, for example, at least one of a type, a model, an operating mode, and a serial number of gas turbine engine 100. Further stored in memory 302 are subsequent sets of lightoff parameters (e.g., a second and a third set, and subsequent sets of lightoff parameters) used, as needed, by processor 301 to facilitate gas turbine engine 100 achieving robust lightoff and successful starting, as further described below.

During step 408, processor 301 is further programmed to determine a rotational velocity value of rotor (e.g., also referred to as "N2" and core speed). Also, in the exemplary embodiment, values of N2 represent at least one of specific values of rotor rotational velocities at specific times and percentage values relative to a maximum operating N2 value attainable by rotor during operation of gas turbine engine 100. To determine rotational velocity value, processor 301 uses information received by speed sensor 212. Processor 301 is also programmed to determine a rotational velocity rate of change (dN2/dt) value using a plurality of rotational velocity values determined during step 408.

Also, during step 408, processor 301 is programmed to compare rotational velocity value to at least one of a first predetermined rotational velocity value and a first predetermined range of rotational velocity values. In the exemplary embodiment, at least one of first predetermined rotational velocity value and first predetermined range of rotational velocity values is stored in memory 302 and are predetermined based on, for example, at least one of type, model, operating mode, and serial number of gas turbine engine 100. For example, and without limitation, first predetermined range of rotational velocity values (e.g., "$R_1$") is about 10% to 25% of maximum operating N2 value. Processor 301 is also programmed to compare a first dN2/dt value to a predetermined range of first dN2/dt values representative of a stabilization of rotor at a windmill speed. In the exemplary embodiment, first dN2/dt value being substantially equal to zero is further representative of stabilization of rotor at windmill speed. Also, during step 408, processor 301 is programmed to determine whether or not a first condition is met. First condition includes rotational velocity value determined during step 408 being one of substantially equal to a windmill speed value and less than first predetermined rotational velocity value. In an alternative embodiment, first condition includes rotational velocity value determined during step 408 being at least one of substantially equal to windmill speed value and less than first predetermined rotational velocity value. In yet another embodiment, first condition also includes first dN2/dt value determined during step 408 being at least one of less than a predetermined first dN2/dt value and within a predetermined range of first dN2/dt values.

If processor 301 determines that first condition is met during step 408, processor 301 is programmed to proceed from step 408 to a step 410. During step 410, processor 301 is programmed to determine operational status of starter 210 using information contained in starter status signal 338 received from starter 210. If starter status signal 338 indicates that starter 210 is not turned on, processor 301 begins restarting gas turbine engine 100 by transmitting starter signal 332 having first value from controller 204 to starter 210 to turn on starter 210 and apply torque to rotor to facilitate increasing rotational velocity thereof. From step 410, processor 301 proceeds to a step 412. Processor 301 also proceeds from step 408 directly to step 412 if, during step 408, processor 301 determines that first condition is not met.

During step 412, processor 301 is programmed to use information received by speed sensor 212 to again determine rotational velocity value of rotor. Processor 301 is also programmed to determine a second dN2/dt value using a plurality of rotational velocity values determined during step 412. Also, during step 412, processor 301 is programmed to compare rotational velocity value to at least one of a second predetermined rotational velocity value and a second predetermined range of rotational velocity values. In the exemplary embodiment, at least one of second predetermined rotational velocity value and second predetermined range of rotational velocity values is stored in memory 302 and are predetermined based on, for example, at least one of type, model, operating mode, and serial number of gas turbine engine 100. For example, and without limitation, second predetermined range of rotational velocity values (e.g., "$R_2$") is about 25% to 40% of maximum operating N2 value.

Also, during step 412, processor 301 is programmed to determine whether or not a second condition is met. Second condition includes rotational velocity value determined during step 412 being greater than second predetermined rotational velocity value. In an alternative embodiment, second condition includes second dN2/dt value determined during step 412 being at least one of greater than a predetermined second dN2/dt value and within a predetermined range of second dN2/dt values. If processor 301 determines that second condition is met during step 412, processor 301 is programmed to proceed from step 412 to a step 414. During step 414, processor 301 is programmed to determine operational statuses of fuel flow valve 206 and ignitor 203 using information contained in valve status signal 342 and ignitor status signal 340, respectively. If valve status signal 342 and ignitor status signal 340 indicate that fuel flow valve 206 is not open and ignitor 203 is de-energized, respectively, processor 301 is also programmed to continue restarting gas turbine engine 100. During step 414, processor 301 continues restarting gas turbine engine 100 using first set of lightoff parameters by transmitting valve signal 336 and ignitor signal 334 from controller 204 to fuel flow valve 206 and ignitor 203, respectively. Also, during step 414, valve signal 336 and ignitor signal 334 have values which facilitate implementing first set of lightoff parameters in process 400 and further facilitate gas turbine engine 100 achieving robust lightoff. Specifically, valve signal 336 transmitted to fuel flow valve 206 has first value to facilitate injecting fuel at a first flow rate into combustor 120, and ignitor signal 334 transmitted to ignitor 203 has first value to facilitate energizing ignitor 203 and igniting fuel in combustor 120. From step 414, processor 301 proceeds to a step 416. On the other hand, if processor 301 determines that second condition is not met during step 412, processor 301 proceeds from step 412 to an end state 413, whereby process 400 re-enters start state 402 so long as pilot has not aborted or paused process 400.

During step 416, processor 301 is programmed to use information received by speed sensor 212 to again determine rotational velocity value of rotor. Processor 301 is also programmed to determine a third dN2/dt value using a plurality of rotational velocity values determined during step 416. Also, during step 416, processor 301 is programmed to compare rotational velocity to at least one of a third predetermined rotational velocity value and a third predetermined range of rotational velocity values. In the exemplary embodiment, at least one of third predetermined rotational velocity value and third predetermined range of rotational velocity values is stored in memory 302 and are predetermined based on, for example, at least one of type, model, operating mode, and serial number of gas turbine engine 100. In an alternative embodiment, memory 302 stores a probabilistic model to facilitate determining third predetermined rotational velocity value and third predetermined range of rotational velocity values based on at least one of type, model, operating mode, and serial number of gas turbine engine 100. For example, and without limitation, third predetermined range of rotational velocity values (e.g., "$R_3$") is about 30% to 40% of maximum operating N2 value. In the exemplary embodiment, third predetermined rotational velocity value is greater than first predetermined rotational velocity value and second predetermined rotational velocity value, and $R_3$ includes an upper range value that is greater than upper range value of $R_1$ and upper range value of $R_2$.

During step 416, processor 301 is further programmed to use information received by temperature sensor 214 to determine a temperature value of exhaust gas 216. Processor 301 is also programmed to determine an exhaust gas 216 temperature rate of change value using a plurality of exhaust gas 216 temperature values determined during step 416. Also, during step 416, processor 301 is programmed to compare exhaust gas 216 temperature value to at least one of a predetermined exhaust gas 216 temperature value and a predetermined range of exhaust gas 216 temperature values. In the exemplary embodiment, at least one of predetermined exhaust gas 216 temperature value and predetermined range of exhaust gas 216 temperature values is stored in memory 302 and are predetermined based on, for example, at least one of type, model, operating mode, and serial number of gas turbine engine 100. In an alternative embodiment, memory 302 stores a probabilistic model to facilitate determining predetermined exhaust gas 216 temperature value and predetermined range of exhaust gas 216 temperature values based on at least one of type, model, operating mode, and serial number of gas turbine engine 100.

Also during step 416, processor 301 is programmed to determine whether or not a third condition is met. Third condition includes a first set of operational parameters for gas turbine engine 100 not being maintained for a first predetermined amount of time. A value of first predetermined amount of time is stored in memory 302 and is predetermined based on, for example, at least one of type, model, operating mode, and serial number of gas turbine engine 100. In the exemplary embodiment, first predetermined amount of time is substantially equal to one minute. In an alternative embodiment, first predetermined amount of time is less than one minute. In still other embodiments, first predetermined amount of time is greater than one minute.

Also, in the exemplary embodiment, first set of operational parameters includes exhaust gas temperature determined during step 416 being greater than a predetermined temperature value. First set of operational parameters also includes an exhaust gas temperature rate of change value determined during step 416 being greater than a predetermined temperature rate of change value. First set of operational parameters further includes a rate of change of the rotational velocity (e.g., third dN2/dt value) determined during step 416 being greater than a predetermined third dN2/dt value first set of operational parameters includes third dN2/dt value determined during step 416 being at least one of greater than a predetermined third dN2/dt value and within a predetermined range of third dN2/dt values. In an alternative embodiment, first set of operational parameters includes rotational velocity determined during step 416 being greater than third predetermined rotational velocity value. Thus, first set of operational parameters being maintained for first predetermined amount of time is representative of a presence of robust lightoff in gas turbine engine 100.

If processor 301 determines that third condition is met during step 416, and thus robust lightoff has not occurred in gas turbine engine 100, processor 301 is programmed to proceed from step 416 to a step 418. During step 418, processor 301 is programmed to determine operational status of starter 210 using information contained in starter status signal 338 received from starter 210. If starter status signal 338 indicates that starter 210 is turned on, processor 301 transmits starter signal 332 having second value from controller 204 to starter 210 to turn off starter 210 such that starter 210 no longer applies torque to rotor of gas turbine engine 100. From step 418, processor 301 proceeds to a step 420. Processor 301 also proceeds from step 416 directly to step 420 if, during step 416, processor 301 determines that third condition is not met, and thus robust lightoff has occurred in gas turbine engine 100.

During step 420, processor 301 is programmed to use information received by at least one of speed sensor 212 and temperature sensor 214 to confirm, including, without limitation, after a second predetermined amount of time after first predetermined amount of time has elapsed, whether or not first set of operational parameters are still being maintained by gas turbine engine 100. A value of second predetermined amount of time is stored in memory 302 and is predetermined based on, for example, at least one of type, model, operating mode, and serial number of gas turbine engine 100. In the exemplary embodiment, second predetermined amount of time is substantially equal to one minute. In an alternative embodiment, second predetermined amount of time is less than one minute. In still other embodiments, second predetermined amount of time is greater than one minute. During step 420, processor 301 is therefore programmed to determine whether or not a fourth condition is met. Fourth condition includes first set of operational parameters, and thus robust lightoff, continuing to be maintained by gas turbine engine 100 for second predetermined amount of time.

If processor 301 determines that fourth condition is met during step 420, processor 301 is programmed to proceed from step 420 to a step 422. During step 422, processor 301 is programmed to determine operational status of starter 210 using information contained in starter status signal 338 received from starter 210. If starter status signal 338 indicates to processor 301 that starter 210 is turned off, processor 301 transmits starter signal 332 having first value from controller 204 to starter 210 to turn on starter 210 and apply torque to rotor to facilitate further increasing rotational velocity thereof. From step 422, processor 301 proceeds to a step 424. During step 424, processor 301 is programmed to use information received by speed sensor 212 to again determine rotational velocity value of rotor. Processor 301 is also programmed to determine a fourth dN2/dt value using a plurality of rotational velocity values determined during step 424. Also, during step 424, processor 301 is programmed to compare rotational velocity to at least one of a fourth predetermined rotational velocity value and a fourth predetermined range of rotational velocity values. In the exemplary embodiment, at least one of fourth predetermined rotational velocity value and fourth predetermined range of rotational velocity values is stored in memory 302 and are predetermined based on, for example, at least one of type, model, operating mode, and serial number of gas turbine engine 100. In an alternative embodiment, memory 302 stores a probabilistic model to facilitate determining fourth predetermined rotational velocity value and fourth predetermined range of rotational velocity values based on at least one of type, model, operating mode, and serial number of gas turbine engine 100. For example, and without limitation, fourth predetermined range of rotational velocity values (e.g., "$R_4$") is about 60% to 70% of maximum operating N2 value. In the exemplary embodiment, fourth predetermined rotational velocity value is greater than third predetermined rotational velocity value, and $R_4$ includes an upper range value that is greater than upper value of $R_3$. Further, in the exemplary embodiment, fourth predetermined rotational velocity value and fourth predetermined range of rotational velocity values are representative of an idle operating state and a successful starting of gas turbine engine 100.

Also, during step 424, processor 301 is programmed to determine whether or not a fifth condition is met. Fifth condition is representative of successful starting of gas turbine engine 100 and includes rotational velocity determined during step 424 being at least one of greater than fourth predetermined rotational velocity value and within fourth predetermined range of rotational velocity values. If processor 301 determines that fifth condition is met during step 424, processor 301 is programmed to proceed from step 424 to a step 426. During step 426, processor 301 is also programmed to determine operational statuses of starter 210 and ignitor 203 using information contained in starter status signal 338 and ignitor status signal 340, respectively. If starter status signal 338 indicates that starter 210 is turned on during step 426, processor 301 is programmed to transmit starter signal 332 having second value from controller 204 to starter 210 to turn off starter 210. If ignitor status signal 340 indicates that ignitor 203 is energized during step 426, processor 301 is further programmed to transmit ignitor signal 334 having second value from controller 204 to ignitor 203 to de-energize ignitor 203. Also, during step 414, valve signal 336 and ignitor signal 334 have values which facilitate implementing first set of lightoff parameters in process 400 and further facilitate gas turbine engine 100 achieving robust lightoff. From step 426, processor 301 proceeds to end state 413. Processor 301 also proceeds from step 424 directly to end state 413 if processor 301 determines that fifth condition is not met during step 424, and thus gas turbine engine 100 has not successfully started.

TABLE 1

Required Conditions For Successfully Starting Gas Turbine Engine in Process 400.

| Step | Required Condition | Corresponding N2 Condition | Corresponding Exhaust Gas Temperature (EGT) Condition | System Action(s) |
|---|---|---|---|---|
| 408 | First Condition True (T); Abnormal Shutdown | Engine Windmilling at N2 < Idle Speed (First Predetermined Rotational Velocity Value (PRVV)) | EGT < Predetermined Shutdown Temp. | Turn on Starter 210 |
| 412 | Second Condition True (T) | N2 > Second PRVV | Not Required | Open Fuel Flow Valve 206 & Ener- |

TABLE 1-continued

Required Conditions For Successfully Starting
Gas Turbine Engine in Process 400.

| Step | Required Condition | Corresponding N2 Condition | Corresponding Exhaust Gas Temperature (EGT) Condition | System Action(s) |
|---|---|---|---|---|
| | | | | gize Ignitor 203 |
| 416 | Third Condition False (F); Robust Lightoff | First Set of Operational Parameters Maintained for First Predetermined Amount of Time (PAT) (Third dN2/dt > Predetermined Third dN2/dt Value) | If Applicable, EGT > Predetermined Temperature Value (PTV) and/or EGT Rate of Change Value (RCV) > Predetermined Temperature Rate of Change Value (PTRCV) | Keep Starter 210 Turned On |
| 420 | Fourth Condition True (T); Robust Lightoff Confirmed | First Set of Operational Parameters Are Maintained for Second PAT (N2 > Third PRVV) | If Applicable, EGT > PTV and/or EGT RCV > PTRCV | Keep Starter 210 Turned On |
| 424 | Fifth Condition True (T); Successful Starting | N2 > Fourth PRVV (Idling) | Not Required | Turn Starter 210 Off & De-Energize Ignitor 203 |

Table 1 above summarizes steps 408 through 426 of process 400 for an exemplary embodiment. In order for gas turbine engine to progress through step 408 to step 422, and further to achieve successful starting and perform step 426, Table 1 shows the requisite conditions which must be met in process 400.

Also, in the exemplary embodiment, if, during step 424, processor 301 determines that fifth condition is not met and gas turbine engine 100 has not successfully started, processor 301 is programmed to selectively proceed from end state 413 to start state 402 if processor 301 again determines that starting is required (as described above). During such a subsequent entry (e.g., iteration) by processor 301 into process 400, processor 301 is programmed to iteratively determine at least one subsequent first set of lightoff parameters and again restart gas turbine engine 100 using a respective subsequent first set of the at least one determined first set of lightoff parameters. If, upon completion of at least one iteration from start state 402 to step 408 and through process 400 to end state 413 through step 424, processor 301 again enters step 408, a plurality of subsequent first sets of lightoff parameters are determined by processor 301. Process 400 continues in this manner until at least one of processor 301 determines first set of operational parameters is maintained for second predetermined amount of time during step 420 and processor 301 determines successful starting of gas turbine engine 100 during step 424, as described above.

If, during step 420, processor 301 determines that fourth condition is not met, and thus robust lightoff is not maintained for second predetermined amount of time, processor 301 proceeds from step 420 to a step 430. During step 430, processor 301 is programmed to determine whether or not gas turbine engine 100 has partial lightoff. Partial lightoff is determined by processor 301 based on, for example, and without limitation, exhaust gas 216 temperature rate of change value (determined during steps 416 and/or 420) being less than, by a first predetermined quantity, at least one of predetermined exhaust gas 216 temperature rate of change value and predetermined range of exhaust gas 216 temperature rate of change values. Also, during step 430, processor 301 is also programmed to determine partial lightoff based on, for example, and without limitation, third dN2/dt value (determined during steps 416 and/or 420) being less than, by a second predetermined quantity, at least one of predetermined third dN2/dt value and predetermined range of third dN2/dt values. By thus comparing at least one of exhaust gas 216 temperature value, exhaust gas 216 temperature rate of change value, rotational velocity value, and third dN2/dt value (determined during steps 416 and/or 420), processor 301 is also programmed to determine a second set of operational parameters representative of partial lightoff.

Upon determining that gas turbine engine 100 has partial lightoff during step 430, processor 301 proceeds from step 430 to a step 432. During step 432, processor 301 determines a second set of lightoff parameters for use in a subsequent iteration of restarting gas turbine engine 100, including steps 408 to 420 of process 400. As with restarting gas turbine engine 100 using first set of lightoff parameters, processor 301 continues restarting gas turbine engine 100 using second set of lightoff parameters until first set of operational parameters are maintained for first predetermined amount of time and second predetermined amount of time. Second set of lightoff parameters determined by processor 301 includes a second flow rate of fuel from fuel flow valve 206 into combustor 120. In the exemplary embodiment, second flow rate is greater than first flow rate. In an alternative embodiment, second flow rate is less than first flow rate. In still other embodiments, second flow rate is substantially equal to first flow rate.

Also, during step 432, processor 301 is programmed to adjust, by at least one of increasing and decreasing, at least one value selected from a set of values including first predetermined amount of time, second predetermined amount of time, first predetermined rotational velocity value, second predetermined rotational velocity value, and third predetermined rotational velocity value. In an alternative embodiment, during step 432, processor 301 is also programmed to adjust at least one of predetermined exhaust gas 216 temperature value, predetermined range of exhaust gas 216 temperature range values, predetermined exhaust gas 216 temperature rate of change value, and predetermined range of exhaust gas 216 temperature rate of change values. In still other embodiments, during step 432, processor 301 is further programmed to adjust at least one of first dN2/dt value, second dN2/dt value, third dN2/dt value, predetermined range of first dN2/dt values, predetermined range of second dN2/dt values, and predetermined range of third dN2/dt values. Thus, during step 432, processor 301 adjusts at least one value of the above listed predetermined values, stores the adjusted value(s) in memory 302, and implements a partial lightoff adaptive control scheme used for restarting gas turbine engine 100 using second set of lightoff parameters. For example, and without limitation, during step 432, processor 301 increases fuel flow rate for use in step 414 to second flow rate greater than first flow rate. Also, for example, and without limitation, during step 432, processor 301 adjusts at least one of first ($R_1$), second ($R_2$), and third ($R_3$) predetermined ranges of rotational velocity values. Thus, during step 432, processor 301 implements partial lightoff adaptive control scheme (e.g., for use in steps 408, 410, 412, 414, 416, 418, and 420) to facilitate establishing favorable physical conditions for maintaining first operational parameters for first predetermined amount of time and second predetermined amount of time, and for achieving a successful start in gas turbine engine 100, as described above.

If, after processor 301 again restarts gas turbine engine 100 using second set of lightoff parameters and partial lightoff adaptive control scheme, processor 301 again determines partial lightoff during step 430, processor 301 again enters step 432. During such a subsequent entry (e.g., iteration) by processor 301 to step 432, processor 301 is programmed to iteratively determine at least one subsequent second set of lightoff parameters and again restart gas turbine engine 100 using at least one respective subsequent second set of lightoff parameters. During subsequent iterations of step 432, processor 301 is programmed to make further adjustments, as described above, including, without limitation, at least one of value of the above listed predetermined values that has not been adjusted by processor 301 during a prior iteration of step 432. For example, if, during prior iteration of step 432, processor 301 increased $R_2$ from about 25% to 40% of maximum operating $R_2$ value to about 30% to 45% of maximum operating N2 value, during a subsequent step 432 iteration, processor 301 is programmed to at least one of further increase $R_2$, further decrease $R_2$, and return $R_2$ to a range used in prior iteration of step 432. Similarly, during subsequent iterations of step 432, processor 301 is programmed to determine subsequent second sets of lightoff parameters by, for example, at least one of further increasing second flow rate, returning second flow rate to a value substantially equal to first flow rate, and decreasing second flow rate to a value less than first flow rate.

From step 432, processor 301 is also programmed to re-enter step 408 and proceed to restart gas turbine engine 100 using second set of lightoff parameters. If, however, during step 430, processor 301 determines gas turbine engine 100 has no lightoff condition, processor 301 proceeds from step 430 to a step 434, rather than to step 432. No lightoff condition is determined by processor 301 based on, for example, and without limitation, exhaust gas 216 temperature rate of change value (determined during steps 416 and/or 420) being less than, by a third predetermined quantity greater than first predetermined quantity, at least one of predetermined exhaust gas 216 temperature rate of change value and predetermined range of exhaust gas 216 temperature rate of change values. Also, during step 430, processor 301 is programmed to determine no lightoff condition based on, for example, and without limitation, third dN2/dt value (determined during steps 416 and/or 420) being less than, by a fourth predetermined quantity greater than second predetermined quantity, at least one of predetermined third dN2/dt value and predetermined range of third dN2/dt values. By thus comparing at least one of exhaust gas 216 temperature value, exhaust gas 216 temperature rate of change value, rotational velocity value, and third dN2/dt value (determined during steps 416 and/or 420), processor 301 is also programmed to determine a third set of operational parameters representative of no lightoff condition.

Upon determining that gas turbine engine 100 has no lightoff condition, processor 301 proceeds from step 430 to step 434. During step 434, processor 301 determines a third set of lightoff parameters for use in a subsequent iteration of restarting gas turbine engine 100, including steps 408 to 420 of process 400. As with restarting gas turbine engine 100 using first set of lightoff parameters, processor 301 continues restarting gas turbine engine 100 using third set of lightoff parameters until first set of operational parameters are maintained for first predetermined amount of time and second predetermined amount of time. Third set of lightoff parameters determined by processor 301 includes a third flow rate. In the exemplary embodiment, third flow rate is greater than first flow rate and second flow rate. In an alternative embodiment, third flow rate is less than at least one of first flow rate and second flow rate. In still other embodiments, third flow rate is substantially equal to first flow rate and second flow rate.

Also, during step 434, processor 301 is programmed to adjust, by at least one of increasing and decreasing, at least one value selected from the set of values including first predetermined amount of time, second predetermined amount of time, first predetermined rotational velocity value, second predetermined rotational velocity value, and third predetermined rotational velocity value. In an alternative embodiment, during step 434, processor 301 is also programmed to adjust at least one of predetermined exhaust gas 216 temperature value, predetermined range of exhaust gas 216 temperature range values, predetermined exhaust gas 216 temperature rate of change value, and predetermined range of exhaust gas 216 temperature rate of change values. In still other embodiments, during step 434, processor 301 is further programmed to adjust at least one of first dN2/dt value, second dN2/dt value, third dN2/dt value, predetermined range of first dN2/dt values, predetermined range of second dN2/dt values, and predetermined range of third dN2/dt values. Thus, during step 434, processor 301 adjusts at least one value of the above listed predetermined values, stores the adjusted value(s) in memory 302, and implements a no lightoff condition adaptive control scheme used for restarting gas turbine engine 100 using third set of lightoff parameters. For example, and without limitation, during step 434, processor 301 increases fuel flow rate for use in step 414 to third flow rate greater than first flow rate and second flow rate. Also, for example, and without limitation, during step 434, processor 301 adjusts at least one of first ($R_1$), second ($R_2$), and third ($R_3$) predetermined ranges of rotational velocity values. Thus, during step 434, processor 301 implements no lightoff condition adaptive control scheme (e.g., for use in steps 408, 410, 412, 414, 416, 418, and 420) to facilitate establishing favorable physical conditions for maintaining first operational parameters for first predetermined amount of time and second predetermined amount of time, and for achieving a successful start in gas turbine engine 100, as described above.

If, after processor 301 restarts gas turbine engine 100 using third set of lightoff parameters and no lightoff condition control scheme, processor 301 again determines no lightoff condition during step 430, processor 301 again enters step 434. During such a subsequent entry (e.g., iteration) by processor 301 to step 434, processor 301 is programmed to iteratively determine at least one subsequent third set of lightoff parameters and again restart gas turbine engine 100 using at least one respective subsequent third set of lightoff parameters. During subsequent iterations of step 434, processor 301 is programmed to make further adjustments, as described above, including, without limitation, at least one of value of the above listed predetermined values that has not been adjusted by processor 301 during a prior iteration of step 434. For example, if, during a prior iteration of step 434, processor 301 increased $R_2$ from about 25% to 40% of maximum operating $R_2$ value to about 30% to 45% of maximum operating N2 value, during a subsequent step 434 iteration, processor 301 is programmed to at least one of further increase $R_2$, further decrease $R_2$, and return $R_2$ to a range used in prior iteration of step 434. Similarly, during subsequent iterations of step 434, processor 301 is programmed to determine subsequent third sets of lightoff parameters by, for example, at least one of further increasing third flow rate, returning third flow rate to a value substantially equal to first flow rate, and decreasing third flow rate to a value less than first flow rate.

Figure 5:
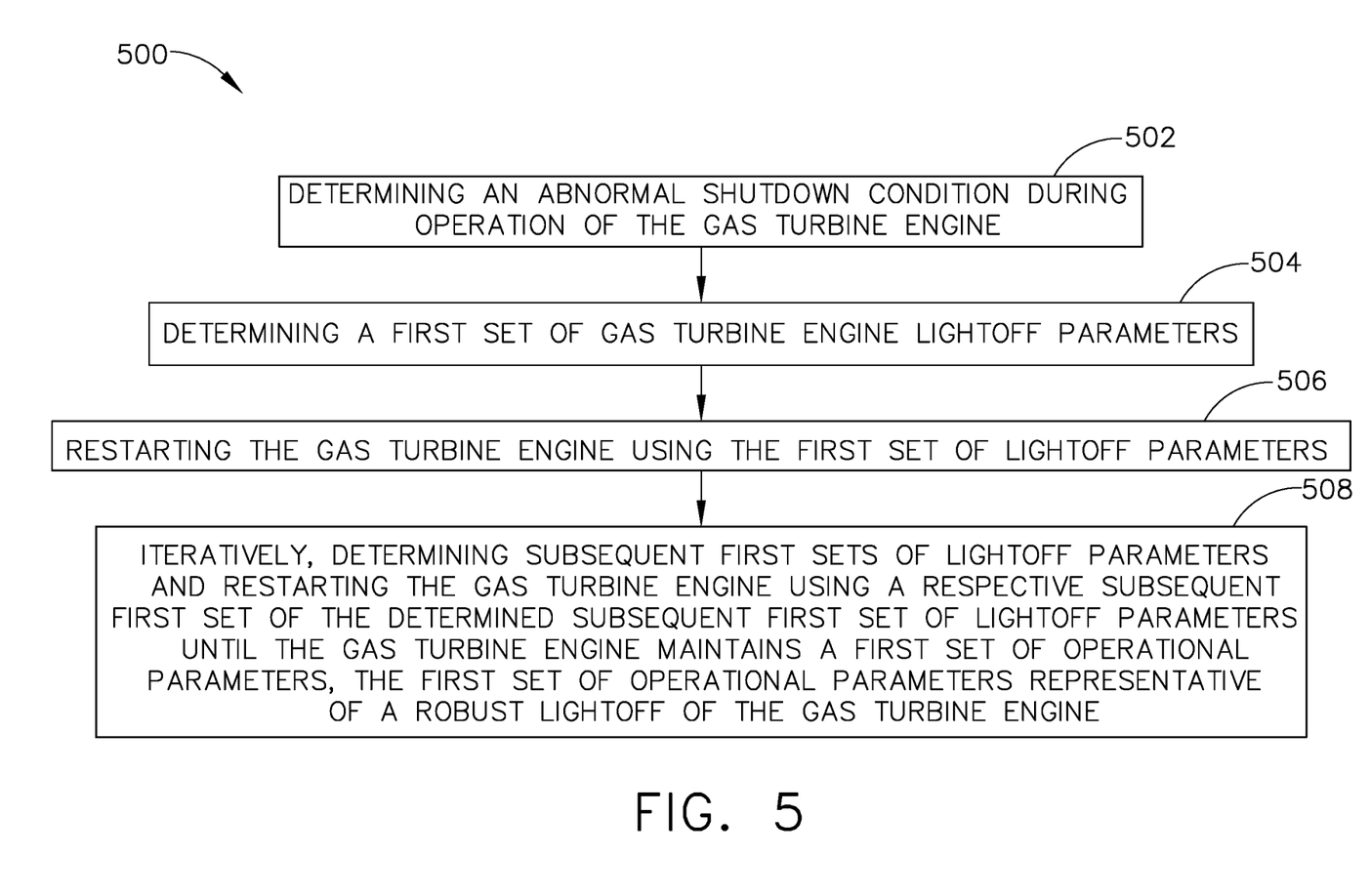
FIG. 5 is a flow chart of an exemplary method of starting a gas turbine engine that may be used with the gas turbine engine shown in FIG. 1 using the systems shown in FIGS. 2 and 3.

FIG. 5 is a flow chart of an exemplary method 500 of starting a gas turbine engine that may be used with gas turbine engine 100 shown in FIG. 1 using system 200 and control system 300 shown in FIGS. 2 and 3, respectively. In the exemplary embodiment, method 500 includes determining 502 an abnormal shutdown condition of the gas turbine engine (e.g., gas turbine engine 100). Method 500 also includes determining 504 first set of lightoff parameters for the gas turbine engine. Method 500 further includes restarting 506 the gas turbine engine using the first set of lightoff parameters. Method 500 also includes iteratively determining 508 subsequent first sets of lightoff parameters and restarting the gas turbine engine using a respective subsequent first set of the determined subsequent first sets of lightoff parameters until the gas turbine engine maintains the first set of operational parameters, where the first set of operational parameters is representative of robust lightoff of the gas turbine engine.

The above-described systems and methods for starting gas turbine engines provide for improved assistive starting including, without limitation, under high altitude operating conditions, relative to known systems and methods. The above-described systems and methods also facilitate adaptive assisted start control schemes to provide faster and more reliable gas turbine assistive starting relative to known systems and methods. The above-described systems and methods further facilitate fast and reliable assistive starting of gas turbine engines under widely varying operational and environment conditions such as high altitude airspace and at high elevation airports. Furthermore, the above-described systems and methods facilitate utilization of additional relevant parameters to provide assistive start controllers more information for use in improved control schemes relative to known systems. The above-described systems and methods also loosen operational restrictions with respect to air start envelopes for aircraft gas turbine engines. Moreover, the above-described systems and methods are implementable in a wide variety of gas turbine engines for aircraft and other turbomachinery systems, and are readily adaptable to retrofit and upgrade maintenance operations without requiring substantial redesign. The above-described gas turbine engine starting systems and methods are not limited to any single type of gas turbine engine or turbomachinery system, or operational or environment conditions thereof, but rather may be implemented with any system requiring a robust and adaptable assistive start control scheme to improve operational reliability, lessen the time required for assistive start under a wide variety of operational and environmental conditions, and increase the number of turbomachinery systems and gas turbine engines capable of benefiting therefrom.

An exemplary technical effect of the methods, systems, and apparatus described herein includes at least one of: (a) providing improved assistive starting of gas turbine engines including at high altitude operating conditions; (b) facilitating adaptive assistive start control schemes to provide faster and more reliable gas turbine engine assistive starting; (c) facilitating fast and reliable assistive starting of gas turbine engines under widely varying operational and environmental conditions such as high altitude airspace and at high elevation airports; (d) facilitating utilization of additional relevant parameters to provide assistive start controllers more information for use in improved control schemes; (e) loosening operational restrictions with respect to air start envelopes for aircraft gas turbine engines; (f) providing implementation in a wide variety of gas turbine engines for aircraft and other turbomachinery systems; and (g) enabling adaptability to retrofit and upgrade maintenance operations without requiring substantial redesign.

Exemplary embodiments of systems and methods for gas turbine engine starting are described above in detail. The above-described systems and methods are not limited to the specific embodiments described herein, but rather, components of systems or steps of the methods may be utilized independently and separately from other components or steps described herein. For example, the methods may also be used in combination with a plurality of gas turbine engines requiring a coordinated assistive start control scheme, and are not limited to practice with only a single aircraft gas turbine engine as described herein. Rather, the exemplary embodiments may be implemented and utilized in connection with many other turbomachinery systems requiring a robust and adaptive assistive start control scheme for improved operation as described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for starting a gas turbine engine, said system comprising: a controller communicatively coupled to a starter, to an ignitor, and to at least one sensor, said controller comprising a processor programmed to:

determine an abnormal shutdown condition during operation of the gas turbine engine;

determine a first set of lightoff parameters for the gas turbine engine, wherein determining the first set of lightoff parameters comprises determining a flow rate of fuel into a combustor of the gas turbine engine and an operational status of the ignitor coupled to the combustor;

determine a temperature of a flow of exhaust gas exiting the gas turbine engine, wherein a first set of operational parameters includes at least one of the exhaust gas temperature being greater than a predetermined temperature value, a temperature rate of change value being greater than a predetermined temperature rate of change value, and a rate of change of a rotational velocity of a rotor of the gas turbine engine being greater than a predetermined rate of change value;

restart the gas turbine engine using the first set of lightoff parameters, wherein said controller is configured to restart the gas turbine engine using the first set of lightoff parameters comprises:

i) when a first condition is met, determining the rotational velocity of the rotor and increasing the rotational velocity, the first condition including the rotational velocity being at least one of: substantially equal to a windmill speed value and less than a first predetermined rotational velocity value;

ii) when a second condition is met, injecting fuel into the combustor at a first flow rate and energizing the ignitor, the second condition including the rotational velocity being greater than a second predetermined rotational velocity value;

iii) when a third condition is met, turning off a starter, the third condition including: the first set of operational parameters not being maintained for a first predetermined amount of time; and the rotational velocity value being greater than a third predetermined velocity value for the first predetermined amount of time, the third predetermined rotational velocity value greater than the second predetermined rotational velocity value; and iteratively, determine subsequent first sets of lightoff parameters and restarting the gas turbine engine using a respective subsequent first set of the determined subsequent first sets of lightoff parameters until the gas turbine engine maintains the first set of operational parameters, the first set of operational parameters representative of a robust lightoff of the gas turbine engine.

2. The system in accordance with claim 1, wherein the processor is further comprising programmed to:
determine a partial lightoff of the gas turbine engine;
iteratively, determine a second set of lightoff parameters; and
restart the gas turbine engine using the second set of lightoff parameters until the gas turbine engine maintains the first set of operational parameters.

3. The system in accordance with claim 1, wherein the processor is further programmed to:
determine a no lightoff condition of the gas turbine engine;
iteratively, determine a third set of lightoff parameters; and
restart the gas turbine engine using the third set of lightoff parameters until the gas turbine engine maintains the first set of operational parameters.

4. The system in accordance with claim 1, wherein the processor is further programmed to:

determine a second set of operational parameters, the second set of operational parameters representative of a partial lightoff of the gas turbine engine;
iteratively, determine a second set of lightoff parameters including a second flow rate;
adjust at least one of the first predetermined amount of time, the first predetermined rotational velocity value, the second predetermined rotational velocity value, and the third predetermined rotational velocity value; and
restart the gas turbine engine using the second set of lightoff parameters until the gas turbine engine maintains the first set of operational parameters.

5. The system in accordance with claim 1, wherein the processor is further programmed to:
determine a third set of operational parameters, the third set of operational parameters representative of a no lightoff condition of the gas turbine engine;
iteratively, determine a third set of lightoff parameters including a third flow rate;
adjust at least one of the first predetermined amount of time, the first predetermined rotational velocity value, the second predetermined rotational velocity value, and the third predetermined rotational velocity value; and
restart the gas turbine engine using the third set of lightoff parameters until the gas turbine engine maintains the first set of operational parameters.

6. The system in accordance with claim 1, wherein the processor is further programmed to:
further increase the rotational velocity when the third condition is not met and a fourth condition is met, the fourth condition including the first set of operational parameters being maintained for a second predetermined amount of time after the first predetermined amount of time;
turn off the starter when a fifth condition is met, the fifth condition representative of a successful starting of the gas turbine engine and including the rotational velocity being greater than a fourth predetermined rotational velocity value, the fourth predetermined rotational velocity value greater than the third predetermined rotational velocity value; and
de-energizing the ignitor.

7. A system for starting a gas turbine engine, the gas turbine engine including a rotor and a combustor having an ignitor configured to ignite a fuel in the combustor, said system comprising:
a starter in torque communication with the rotor;
a fuel flow valve in serial flow communication with the combustor and configured to inject the fuel into the combustor;
at least one sensor coupled to the gas turbine engine, wherein said at least one sensor comprises a speed sensor configured to measure a rotational velocity of the rotor and a plurality of sensors comprising a temperature sensor configured to measure a temperature of a flow of exhaust gas exiting the gas turbine engine; and
a controller communicatively coupled to said starter, to said ignitor, and to said at least one sensor, said controller comprising a processor programmed to:
determine an abnormal shutdown condition of the gas turbine engine;
determine a first set of lightoff parameters for the gas turbine engine, wherein a first set of operational parameters includes at least one of the exhaust gas temperature being greater than a predetermined temperature value, a temperature rate of change value being greater than a predetermined temperature rate of change value, and a rate of change of the rotational velocity being greater than a predetermined rate of change value, and wherein the first set of lightoff parameters further includes a flow rate of the fuel through said fuel flow valve into the combustor and an operational status of the ignitor;

restart the gas turbine engine using the first set of lightoff parameters, wherein in restarting the gas turbine engine using the first set of lightoff parameters, the processor is programmed to:
i) transmit, when a first condition is met, a starter signal having a first value to said starter to facilitate increasing, using said starter, the rotational velocity, the first condition including the rotational velocity being at least one of: substantially equal to a windmill speed value and less than a first predetermined rotational velocity value;
ii) transmit, when a second condition is met, a valve signal having a first value to said fuel flow valve to facilitate injecting the fuel at a first flow rate and an ignitor signal having a first value to the ignitor to facilitate energizing the ignitor, the second condition including the rotational velocity being greater than a second predetermined rotational velocity value;
iii) transmit, when a third condition is met, the starter signal having a second value, the second value different from the first value, to said starter to facilitate turning off said starter, the third condition including: the first set of operational parameters not being maintained for a first predetermined amount of time and the rotational velocity value being greater than a third predetermined rotational velocity value for the first predetermined amount of time, the third predetermined rotational velocity value greater than the second predetermined rotational velocity value; and
iteratively, determine subsequent first sets of lightoff parameters and restart the gas turbine engine using a respective subsequent first set of the determined subsequent first sets of lightoff parameters until the gas turbine engine maintains the first set of operational parameters, the first set of operational parameters representative of a robust lightoff of the gas turbine engine.

8. The system in accordance with claim 7, wherein said processor is further programmed to:
determine a partial lightoff of the gas turbine engine;
iteratively, determine a second set of lightoff parameters; and
restart the gas turbine engine using the second set of lightoff parameters until the gas turbine engine maintains the first set of operational parameters.

9. The system in accordance with claim 7, wherein said processor is further programmed to:
determine a no lightoff condition of the gas turbine engine;
iteratively, determine a third set of lightoff parameters; and
restart the gas turbine engine using the third set of lightoff parameters until the gas turbine engine maintains the first set of operational parameters.

10. The system in accordance with claim 7, wherein said at least one sensor further comprises a plurality of sensors comprising a temperature sensor configured to measure a temperature of a flow of exhaust gas exiting the gas turbine engine, and wherein the first set of operational parameters further includes at least one of the exhaust gas temperature being greater than a predetermined temperature value and a temperature rate of change value being greater than a predetermined temperature rate of change value.

11. The system in accordance with claim 7, wherein said processor is further programmed to:
determine a second set of operational parameters, the second set of operational parameters representative of a partial lightoff of the gas turbine engine;
iteratively, determine a second set of lightoff parameters including a second flow rate;
adjust at least one of the first predetermined amount of time, the first predetermined rotational velocity value, the second predetermined rotational velocity value, and the third predetermined rotational velocity value; and
restart the gas turbine engine using the second set of lightoff parameters until the gas turbine engine maintains the first set of operational parameters.

12. The system in accordance with claim 7, wherein said processor is further programmed to:
determine a third set of operational parameters, the third set of operational parameters representative of a no lightoff condition of the gas turbine engine;
iteratively, determine a third set of lightoff parameters including a third flow rate;
adjust at least one of the first predetermined amount of time, the first predetermined rotational velocity value, the second predetermined rotational velocity value, and the third predetermined rotational velocity value; and
restart the gas turbine engine using the third set of lightoff parameters until the gas turbine engine maintains the first set of operational parameters.

13. The system in accordance with claim 7, wherein said processor is further programmed to:
transmit the starter signal having the first value to said starter to facilitate further increasing, using said starter, the rotational velocity when the third condition is not met and a fourth condition is met, the fourth condition including the first set of operational parameters being maintained for a second predetermined amount of time after the first predetermined amount of time;
transmit the starter signal having the second value to said starter to facilitate turning off said starter when a fifth condition is met, the fifth condition representative of a successful starting of the gas turbine engine and including the rotational velocity being greater than a fourth predetermined rotational velocity value, the fourth predetermined rotational velocity value greater than the third predetermined rotational velocity value; and
transmitting the ignitor signal having a second value, the second value different from the first value, to the ignitor to facilitate de-energizing the ignitor.

14. A non-transitory computer-readable memory having computer-executable instructions embodied thereon, wherein when executed by a computing device, the computer-executable instructions cause the computing device to:
determine an abnormal shutdown condition during operation of a gas turbine engine;
determine a first set of lightoff parameters for the gas turbine engine;
determine a temperature of a flow of exhaust gas exiting the gas turbine engine, wherein a first set of operational parameters includes at least one of the exhaust gas temperature being greater than a predetermined temperature value, a temperature rate of change value being greater than a predetermined temperature rate of change value, and a rate of change of a rotational velocity of a rotor of the gas turbine engine being greater than a predetermined rate of change value;
restart the gas turbine engine using the first set of lightoff parameters, wherein restarting the gas turbine engine using the first set of lightoff parameters comprises:
  i) when a first condition is met, determining the rotational velocity of the rotor and increasing the rotational velocity, the first condition including the rotational velocity being at least one of: substantially equal to a windmill speed value and less than a first predetermined rotational velocity value;
  ii) when a second condition is met, injecting fuel into the combustor at a first flow rate and energizing the ignitor, the second condition including the rotational velocity being greater than a second predetermined rotational velocity value;
  iii) when a third condition is met, turning off a starter, the third condition including: the first set of operational parameters not being maintained for a first predetermined amount of time; and the rotational velocity value being greater than a third predetermined velocity value for the first predetermined amount of time, the third predetermined rotational velocity value greater than the second predetermined rotational velocity value; and
iteratively, determine subsequent first sets of lightoff parameters and restart the gas turbine engine using a respective subsequent first set of the determined subsequent first sets of lightoff parameters until the gas turbine engine maintains the first set of operational parameters, the first set of operational parameters representative of a robust lightoff of the gas turbine engine.

15. The non-transitory computer-readable memory of claim 14, wherein when executed by the computing device, the computer-executable instructions further cause the computing device to:
determine a second set of operational parameters, the second set of operational parameters representative of a partial lightoff of the gas turbine engine;
iteratively, determine a second set of lightoff parameters including a second flow rate;
adjust at least one of the first predetermined amount of time, the first predetermined rotational velocity value, the second predetermined rotational velocity value, and the third predetermined rotational velocity value; and
restart the gas turbine engine using the second set of lightoff parameters until the gas turbine engine maintains the first set of operational parameters.

16. The non-transitory computer-readable memory of claim 14, wherein when executed by the computing device, the computer-executable instructions further cause the computing device to:
determine a third set of operational parameters, the third set of operational parameters representative of a no lightoff condition of the gas turbine engine;
iteratively, determine a third set of lightoff parameters including a third flow rate;
adjust at least one of the first predetermined amount of time, the first predetermined rotational velocity value, the second predetermined rotational velocity value, and the third predetermined rotational velocity value; and
restart the gas turbine engine using the third set of lightoff parameters until the gas turbine engine maintains the first set of operational parameters.

17. The non-transitory computer-readable memory of claim 14, wherein when executed by the computing device, the computer-executable instructions further cause the computing device to:
cause the rotational velocity to further increase when the third condition is not met and a fourth condition is met, the fourth condition including the first set of operational parameters being maintained for a second predetermined amount of time after the first predetermined amount of time;
cause the starter to turn off when a fifth condition is met, the fifth condition representative of a successful starting of the gas turbine engine and including the rotational velocity being greater than a fourth predetermined rotational velocity value, the fourth predetermined rotational velocity value greater than the third predetermined rotational velocity value; and
cause the ignitor to de-energize.

* * * * *